Oct. 11, 1927.

S. H. RICHARDS 1,645,023

ADJUSTABLE VISE

Filed Jan. 21, 1926    2 Sheets-Sheet 1

Inventor
S. H. Richards,

By Clarence A. O'Brien
Attorney

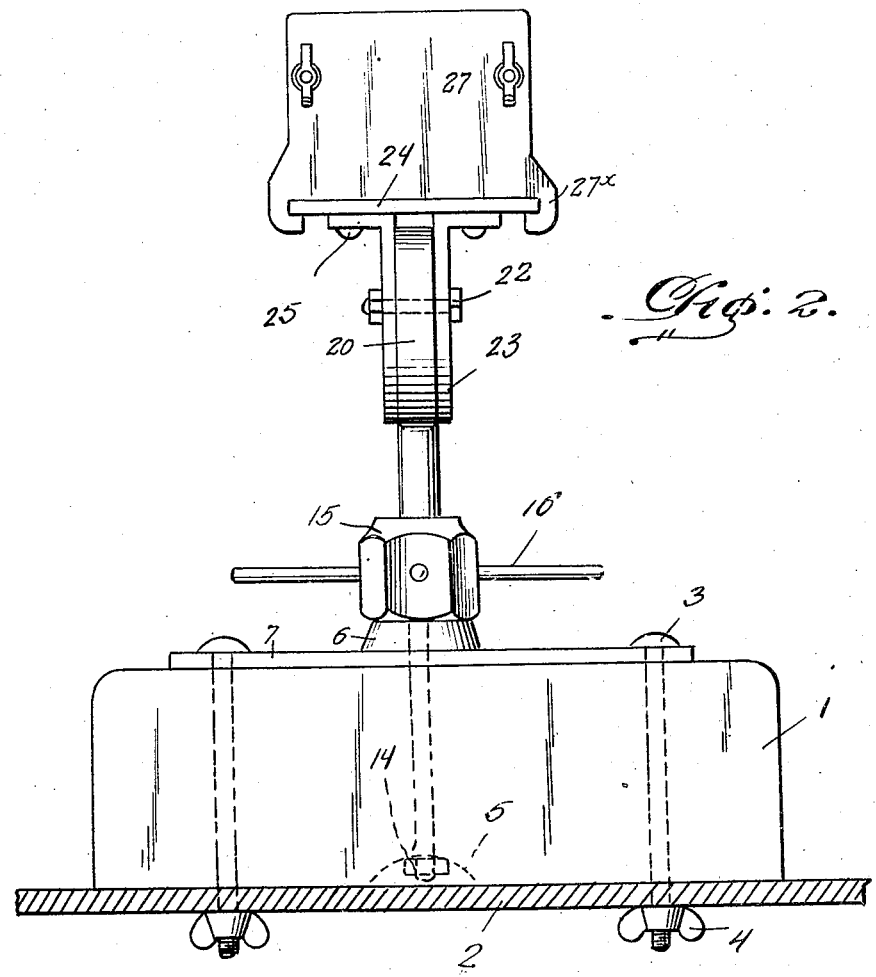
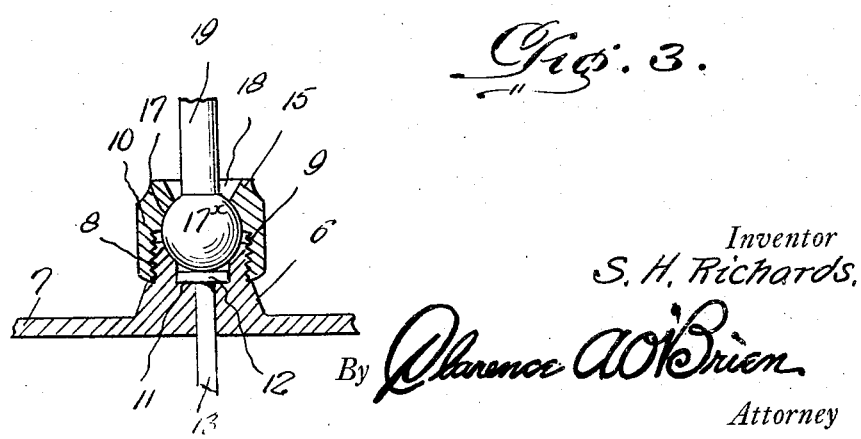

Patented Oct. 11, 1927.

1,645,023

UNITED STATES PATENT OFFICE.

SIDNEY H. RICHARDS, OF INGLEWOOD, CALIFORNIA.

ADJUSTABLE VISE.

Application filed January 21, 1926. Serial No. 82,718.

My present invention has to do with vises and analogous work holding devices; and it contemplates the provision of a vise designed more especially for use by jewelers, engravers and the like, and constructed with a view to enabling a workman to securely hold a piece of work in various positions according to the character of the operation to be performed on the work.

To the attainment of the foregoing, the invention consists in the improvement as hereinafter described and definitely claimed.

In the accompanying drawings, forming part of this specification:—

Figures 1 and 2 are elevations taken at angles to each other and illustrating the vise constituting the best practical embodiment of my invention of which I am cognizant.

Figure 3 is a fragmentary view partly in section and partly in elevation illustrating the ball and socket construction comprised in the vise.

Similar numerals of reference designate corresponding parts in all of the views of the drawings.

Figure 1:
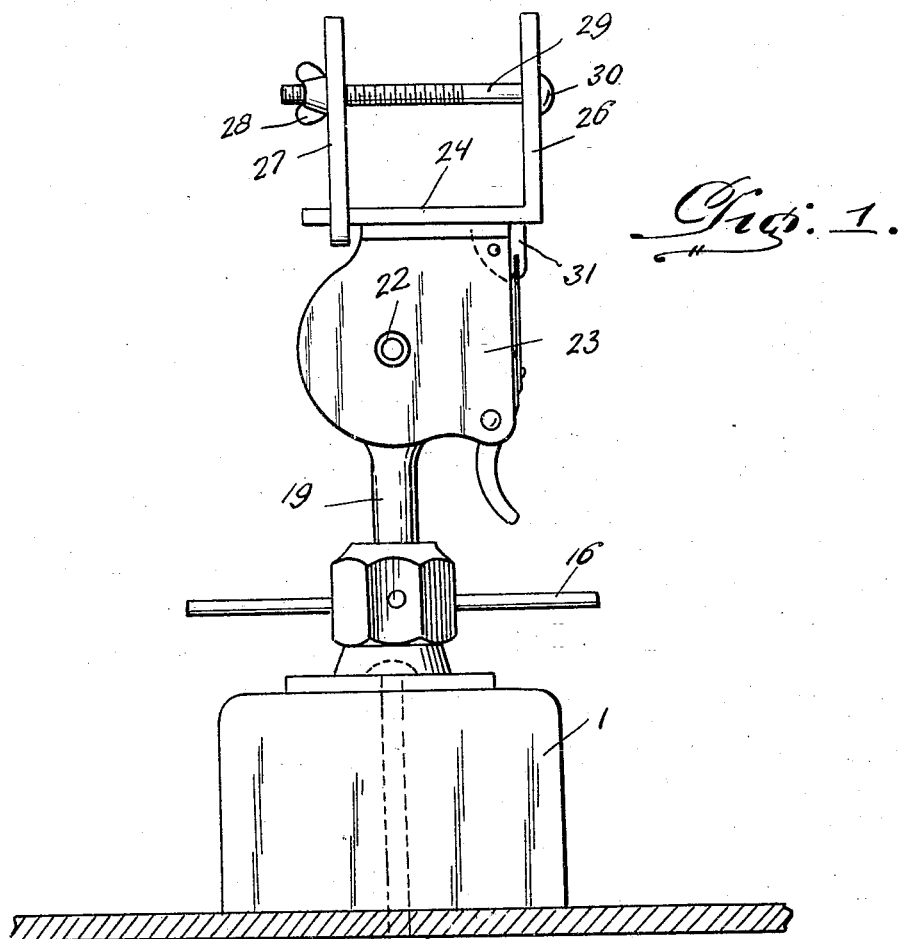
Figure 4:
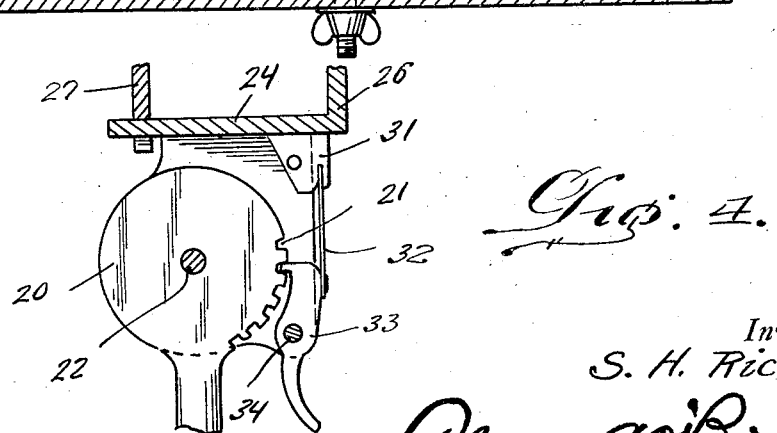
Figure 4 is an enlarged vertical fragmentary section illustrative of the means whereby the upper swingable member of the vise may be adjustably fixed in different positions relative to its supporting stem.

I show in Figure 1 and also in Figure 2, a pedestal 1, superposed upon a table top 2 or other support and fixedly connected thereto through the medium of headed bolts 3 and wing nuts 4. In the lower side of the pedestal 1 is a recess 5, and superposed on the pedestal 1 is a socket member 6 having a base flange 7 and also having an upstanding annular portion 8, exteriorly threaded at 9, and provided with a concave socket bore 10 and also provided with a recess 11 that extends downwardly from said concave socket bore. The recess 11 is to receive the head 12 of a bolt 13 for strongly connecting the member 6 to the pedestal 1, the said bolt 13 being provided in the recess 5 with a nut 14, through the medium of which the connection of the member 6 may be readily tightened when occasion demands. The bolts 3 extend through openings in the flange 7 and assist in holding the same on the pedestal.

Threaded on the upstanding portion of the member 6 is a nut 15 on which are lateral spokes or hand rods 16, designed to enable an operator to readily tighten or loosen the nut 15 when desired. Interiorly the nut 15 is provided with a concavity 17 designed in conjunction with the concavity 10 to receive a ball 17×, and it will also be noticed that the nut 15 has an opening 18 flared outwardly for the play of the stem 19 that extends upwardly from and is fixed with respect to the ball 17. Manifestly when the nut 15 is loosened, the stem 19 may be placed in various positions, and when said nut 15 is tightened, the stem 19 will be adjustably fixed in the position to which it has been adjusted.

Carried at the upper end of the stem 19 and preferably formed integral therewith is a disk 20, toothed at 21. Disposed at opposite sides of the said disk 20 and pivotally connected at 22 thereto are pendent plates 23 on a platform 24, the platform 24 and flanges at the upper ends of the plates 23 being fixedly connected by appropriate means as designated by 25. The said platform 24 is provided with an upstanding flange 26, and guided at 27× on opposite edge portions of the platform 24 is a clamping plate 27, said plate 27 being adjustable before wing nuts 28 on the threaded portions of bolts 29 which extend through the flange 26 and the clamping plate 27 and are headed as designated by 30.

The platform 24 is provided at 31 with a pendent portion, and connected to and depending from said pendent portion 31 is a flat spring 32, the lower end of which is connected to and arranged at the outer side of one arm of a detent 33, pivoted at 34 between the plate 23. The said arm of the detent 33 is provided with a toe to enter the interdental spaces of the disk 20, and the other arm of the detent is preferably shaped as illustrated to permit of the ready movement of the detent against the action of the flat spring 32 when it is desired to disengage the detent from the toothed disk 20 for the canting or swinging adjustment of the plates 23 and the parts carried thereby on the stem 19.

Manifestly in the use of my novel vise wooden dies appropriate to various things to be held in the vise may be employed, but I have not deemed it necessary to illustrate such dies inasmuch as the same per se do not constitute part of my invention.

It will be apparent from the foregoing that various articles may be securely held in detachable manner between the flange 26 and the clamping plate 27; and it will also be apparent that the stem 19 is adapted when the nut 15 is loosened to be turned about its axis and to be placed in various angles of inclination, and when the nut 15 is tightened there will be no liability of casual movement of the said stem 19. Again it will be manifest that the plates 23 may be swingably adjusted on the stem 19 and may be strongly fixed in adjustable manner with respect to the said stem 19 so as to position the work held between the flange 26 and the clamping plate 27 to the best advantage for the purposes of the workman.

Notwithstanding the practical advantages ascribed to my novel vise, designed more especially for the use of jewelers, engravers and the like, it will be appreciated that the vise is simple, compact, inexpensive, and by reason of the facility with which the different adjustments may be made, the vise is calculated to materially promote the accomplishment of any piece of work in hand.

I have specifically described the construction and relative arrangement of the parts embraced in the present and preferred embodiment of my invention in order to impart a full, clear and exact understanding of the said embodiment. I do not desire, however, to be understood as restricting myself to the specific construction and arrangement of parts disclosed, my invention being defined by my appended claim within the scope of which changes in structure and changes in arrangement may be made without departure from my invention.

Having described my invention, what I claim and desire to secure by Letters-Patent, is:—

The combination in a vise, of a platform having spaced portions depending therefrom, a toothed disk, said disk disposed between said pendent portions, means pivotally connecting said portions and the disk, a projection on the platform, a detent pivotally mounted between the pendent portions of the platform and having a toe to engage the toothed portion of the disk, a flat spring connected to the projection on the platform and the detent for yieldingly maintaining the latter in engagement with the toothed disk, and vise jaws mounted on the platform.

In testimony whereof I affix my signature.

SIDNEY H. RICHARDS.